United States Patent
Sebastian et al.

(10) Patent No.: US 10,257,869 B2
(45) Date of Patent: Apr. 9, 2019

(54) DYNAMICALLY INCLUDING AN ACTIVE TUNNEL AS A MEMBER OF A VIRTUAL NETWORK

(71) Applicant: HEWLETT PACKARD ENTERPRISE DEVELOPMENT LP, Houston, TX (US)

(72) Inventors: Celestian K. Sebastian, Bangalore (IN); Anil Raj, Bangalore (IN); Subin Cyriac Mathew, Bangalore (IN); Venkatavaradhan Devarajan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 7 days.

(21) Appl. No.: 15/501,798

(22) PCT Filed: Oct. 29, 2014

(86) PCT No.: PCT/US2014/062865
§ 371 (c)(1),
(2) Date: Feb. 3, 2017

(87) PCT Pub. No.: WO2016/068905
PCT Pub. Date: May 6, 2016

(65) Prior Publication Data
US 2017/0223756 A1 Aug. 3, 2017

(51) Int. Cl.
*H04W 76/12* (2018.01)
*H04W 76/22* (2018.01)
(Continued)

(52) U.S. Cl.
CPC ............. *H04W 76/12* (2018.02); *H04L 12/28* (2013.01); *H04L 12/4633* (2013.01); *H04L 12/4641* (2013.01); *H04W 36/0016* (2013.01); *H04W 76/22* (2018.02); *H04W 76/32* (2018.02); *H04W 92/22* (2013.01)

(58) Field of Classification Search
CPC ...... H04B 17/00; H04B 3/46; H04B 7/18528; H04B 7/18571; H04B 7/18576; H04B 7/2121; H04B 7/2123; H04L 43/00; H04L 43/50; H04W 24/00; H04W 84/06;
(Continued)

(56) References Cited

U.S. PATENT DOCUMENTS 8,243,687 B2   8/2012   Taniuchi et al.
2005/0180358 A1   8/2005   Kolar et al.
(Continued)

OTHER PUBLICATIONS

"HP Unified Wired and Wireless Access," White Paper, 2014, pp. 1-51, Hewlett-Packard Development Company, L.P.
(Continued)

*Primary Examiner* — Dady Chery
(74) *Attorney, Agent, or Firm* — Trop, Pruner & Hu, P.C.

(57) ABSTRACT

In response to movement of a wireless device, an active tunnel between switches is dynamically included as a member of a virtual network over which the wireless device communicates, where data communicated in the virtual network is carried over the active tunnel, and where the virtual network is overlaid on an underlay physical network that includes the switches and the wireless access points.

19 Claims, 4 Drawing Sheets

(51) Int. Cl.
*H04L 12/28* (2006.01)
*H04L 12/46* (2006.01)
*H04W 36/00* (2009.01)
*H04W 76/32* (2018.01)
*H04W 92/22* (2009.01)

(58) Field of Classification Search
CPC ........... H04W 24/18528; H04W 72/04; H04W 72/12; H04J 2203/0069; H04Q 2213/394
See application file for complete search history.

(56) References Cited

U.S. PATENT DOCUMENTS

| | | |
|---|---|---|
| 2006/0098588 A1 | 5/2006 | Zhang et al. |
| 2009/0067400 A1 | 3/2009 | Binet et al. |
| 2011/0200005 A1* | 8/2011 | Park .................... H04W 76/22 370/331 |
| 2012/0078998 A1 | 3/2012 | Son et al. |
| 2012/0201201 A1 | 8/2012 | Liu et al. |
| 2013/0055336 A1 | 2/2013 | Li et al. |
| 2013/0287032 A1 | 10/2013 | Sharma |
| 2014/0086132 A1 | 3/2014 | Liu et al. |
| 2014/0207946 A1 | 7/2014 | Bakthavathsalu et al. |
| 2015/0188773 A1* | 7/2015 | DeCusatis ............ G06F 9/45558 370/254 |

OTHER PUBLICATIONS

"Seamless Voice Mobility," Dec. 18, 2012, pp. 1-3, Feature Sheet, Ruckus Wireless, Inc., Available at: <c541678.r78.cf2.rackcdn.com/feature-sheets/fs-mobility.pdf>.
D. Black et al., "An Architecture for Overlay networks (NVO3)," Internet Engineering Task Force, Internet Draft, Feb. 14, 2014, pp. 1-32, IETF Trust.
International Search Report and Written Opinion, International Application No. PCT/US2014/062865, dated Jul. 24, 2017, pp. 1-9, KIPO.
M. Mahalingam et al., "VXLAN: A Framework for Overlaying Virtualized Layer 2 Networks Over Layer 3 Networks", Network Working Group, Internet Draft, Aug. 26, 2011, pp. 1-20, IETF Trust.
P. Calhoun et al., "Control and Provisioning of Wireless Access Points (CAPWAP) Protocol Specification," Network Working Group, Request for Comments: 5415, Mar. 2009, pp. 1-145, IETF Trust.
International Preliminary Report on Patentability received for PCT Patent Application No. PCT/US2014/062865, dated May 11, 2017, 8 pages.

* cited by examiner

DYNAMICALLY INCLUDING AN ACTIVE TUNNEL AS A MEMBER OF A VIRTUAL NETWORK

BACKGROUND

A wireless endpoint device can establish a wireless link with a wireless access point to allow the wireless device to communicate over a network. A wireless access point is a communication node that includes a wireless transceiver that defines a coverage area within which wireless endpoint devices are able to wirelessly communicate with the communications node. A network can include multiple wireless access points that provide respective coverage areas. As a wireless endpoint device moves, the wireless endpoint device can roam between the different coverage areas and can connect to respective wireless access points.

BRIEF DESCRIPTION OF THE DRAWINGS

Some implementations are described with respect to the following figures.

DETAILED DESCRIPTION

Figure 1:
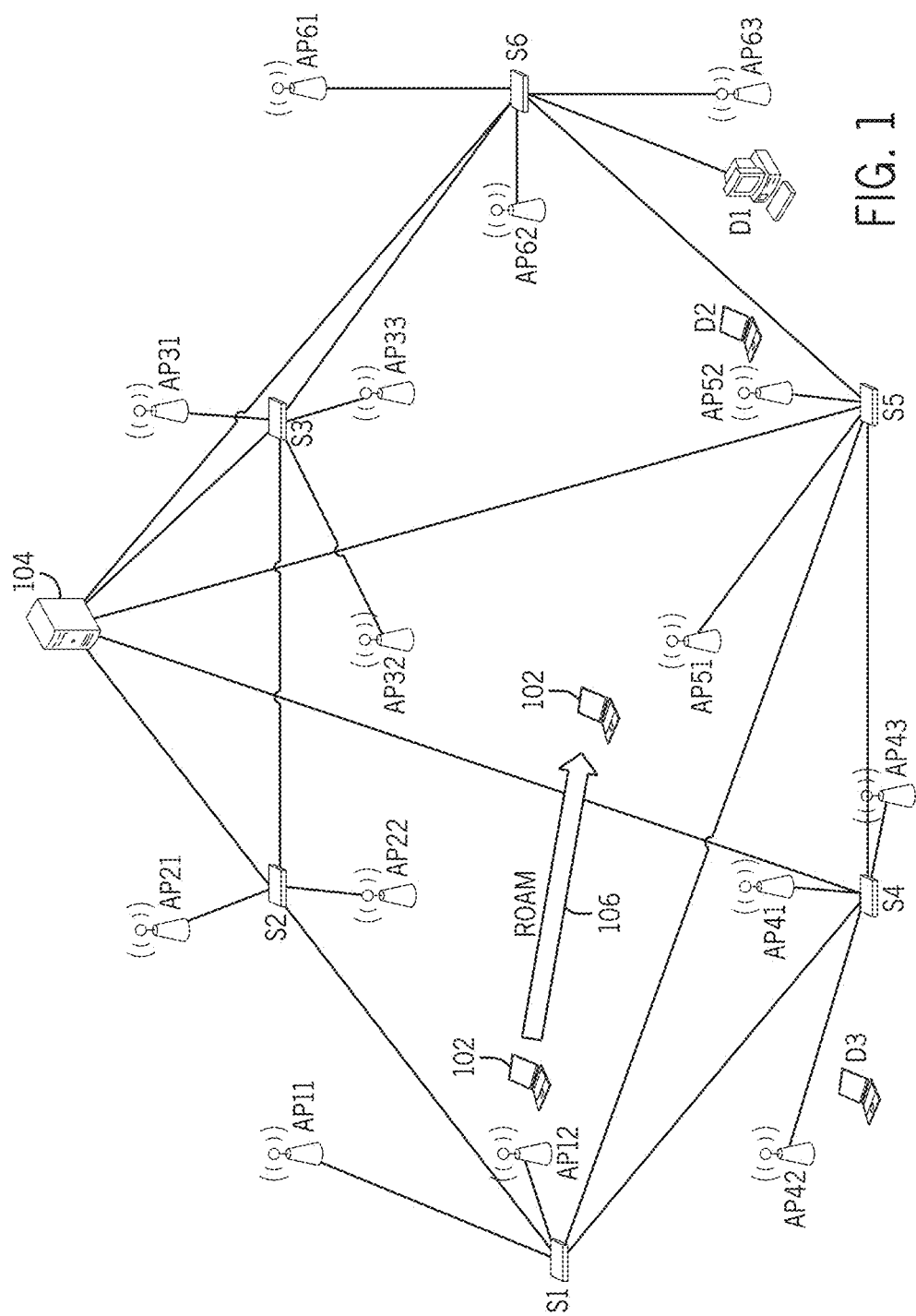
FIG. 1 is a schematic diagram of an example arrangement that has a physical network include wireless access points and switches, in accordance with some implementations.

A physical network can include wireless access points to communicate with wireless endpoint devices, such as computers (e.g. notebook computers, tablet computers, desktop computers, etc.), handheld devices (e.g. smartphones, personal digital assistants, etc.), game appliances, and so forth. The physical network can also include switches, which can be considered to be part of a core network. The switches can be connected to each other over electrical links, optical links, backhaul wireless links, or any combination of the foregoing.

A "switch" can refer to a communication node that performs forwarding of data packets according to forwarding information accessible by the communication node. The forwarding information can be in the form of one or multiple tables that contain entries corresponding to different combinations of values of fields that are to be matched. A data packet received by a switch can include several fields, set to respective values that can be matched to the forwarding table(s) accessible by the switch. The values of the fields in the received packet can match to a respective entry of a forwarding table, and this matched entry can specify a port, from among multiple ports of the switch, over which the switch is to forward the data packet.

A switch can be a layer 2 (L2) switch, a layer 3 (L3) router, or any other communication node that can perform forwarding of a data packet at another layer. The layers referred to above can be layers of the Open Systems Interconnect (OSI) model.

Data communications of a wireless endpoint device can be passed through a wireless access point and a path that includes at least some of the switches of the core network to another endpoint device. In some cases, a switch can be directly connected to a wired endpoint device over an electrical link and/or optical link. The wired endpoint device can also communicate with another endpoint device through a path that includes switches.

In some example implementations, a physical network can be a Unified Wired-Wireless (UWW) network, in which traffic sourced by wireless endpoint devices can be handled by the switches in similar fashion as traffic sourced by wired endpoint devices. Although reference is made to a UWW network in some examples, it is noted that techniques or mechanisms according to some implementations can be used with other types of physical networks in other examples.

To support wireless mobility of a wireless endpoint device, a virtual network over which the wireless endpoint device communicates can be provided and is overlaid over an underlay physical network (that includes wireless access points and switches). A virtual network can be provided using machine-readable instructions at various nodes and can employ certain links of the underlay physical network to provide communication paths over which data of endpoint devices can pass through.

The virtual network can also be referred to as an "overlay network." In some examples, the underlay physical network can be an L2 network, while the virtual network can be a virtual L3 network such as a virtual Internet Protocol (IP) network. In some cases, multiple virtual IP networks can be overlaid on a physical network; in such cases, the virtual IP networks can be referred to as virtual IP subnetworks. The multiple virtual IP subnetworks can be logically separate from one another—for example, the IP address space used by a first virtual IP subnetwork can be different from the IP address space used by a second virtual IP subnetwork.

Tunnels can be formed between switches in the underlay physical network to carry traffic data of a wireless endpoint device that is communicated over the virtual network. A "tunnel" between switches can refer to a logical connection between the switches, where data of the virtual network communicated between the switches over the logical connection is encapsulated in data units. Each data unit includes a header and a payload. The payload carries the virtual network data. The header contains control information according to a tunneling protocol. If security is implemented, then the header can also include security information to protect the content of the payload. Each data unit of the tunnel encapsulates the data of the virtual network (the overlay network). The switches are considered tunnel endpoints. The sending tunnel endpoint performs the encapsulation of the virtual network data in the payload of a data unit to be sent through the tunnel, while the receiving tunnel endpoint decapsulates and extracts the payload from the received data unit. Examples of tunnel protocols include a Layer 2 Tunneling Protocol (L2TP), a Point to Point Tunneling Protocol (PPTP), Layer 2 Forwarding (L2F) protocol, proprietary tunnel protocols, and so forth. Without establishing a tunnel between a specific pair of switches, then it would not be possible to communicate data of the virtual network between the pair of switches.

In some examples, a full mesh of tunnels is created between all the switches that are connected to wireless access points. In other words, given a set of switches that are connected to wireless access points, tunnels can be created between each pair of the switches in the set to cover all possible paths through the switches in the set.

Establishing a full mesh of tunnels between switches can be associated with several issues. The capability of a given switch can prevent more than a maximum number of tunnels from being established with the given switch. For example, N (N>1) tunnels may have been created between the given switch and respective other switches. If N also is the maximum number of tunnels that the given switch can establish, then no further tunnels can be created with the given switch, which can restrict scalability of the overlay network. If a tunnel for a new destination endpoint device cannot be established, then it may not be possible for the overlay network to serve the new destination endpoint device.

In other examples, a full mesh of tunnels can also lead to increased traffic communications and traffic processing in the underlay physical network. For example, if a data packet sent by a wireless endpoint device contains an address that is not yet learned (i.e. the specific destination associated with the address is not yet known), then the data packet may be sent over all tunnels that are members of the overlay network. The data packet is dropped at each tunnel endpoint (a switch that terminates a tunnel) if the tunnel endpoint does not have any active wireless endpoint devices communicating over the overlay network. Copies of the data packet sent over the tunnels that are dropped are considered superfluous data, which consumes network bandwidth and processing resources of switches.

In accordance with some implementations, rather than create a full mesh of active tunnels that can actively carry data of an overlay network (regardless of whether or not the active tunnels are actually in use by wireless endpoint devices connected to an overlay network), active tunnels are dynamically associated with a virtual network (the overlay network) during use of a wireless endpoint device, including when the wireless endpoint device first starts to transmit data (or more generally, when the wireless endpoint device becomes associated with an access point connected to a switch in the core network), and as the wireless endpoint device moves between different wireless access points. More specifically, in some implementations, the active tunnels that are logical members of a virtual network are dynamically updated (1) when the wireless endpoint device becomes associated with an access point connected to a switch in the core network, and (2) as the wireless endpoint device moves between different wireless access points. A wireless endpoint device becoming associated with an access point occurs when the wireless endpoint device initially connects or establishes a link or session with the access point to communicate data.

In some examples, dynamically changing the logical membership of active tunnels in a virtual network can include dynamically creating an active tunnel to include as a member of the virtual network in response to detecting movement of the wireless endpoint device between wireless access points.

In other examples, dynamically changing the logical membership of active tunnels in a virtual network can include transforming a previously passive tunnel to an active tunnel. A passive tunnel between switches is not used to carry data of the overlay network. In these latter examples, a full mesh of tunnels (which are initially passive or inactive) can be created between all switches on which the virtual network is overlaid. However, initially, data is not communicated through the passive tunnels, which conserves network bandwidth and processing resource utilization of switches. As a wireless endpoint device moves between wireless access points, selected passive tunnels can be transformed to active tunnels (a process referred to as joining a specific tunnel to the virtual network).

FIG. 1 shows an example arrangement that includes a core network of switches (including switches S1, S2, S3, S4, S5, and S6). Although six switches are shown in FIG. 1, it is noted that in other examples, different numbers of switches can be included in a core network. Each switch can be connected to one or multiple wireless access points. For example, switch S1 is connected to access points AP11 and AP12, switch S2 is connected to wireless access points AP21 and AP22, and so forth. Although not shown, there can be other switches of the core network that are not connected to any wireless access points.

FIG. 1 also shows a roaming wireless endpoint device 102 (referred to as "client 102" in the ensuing discussion). The client 102 is initially wirelessly connected to the wireless access point AP12. FIG. 1 also shows other endpoint devices, including wireless endpoint device D2 (which is connected to wireless access point AP52) and wired endpoint devices D1 and D3, which are connected to respective switches S6 and S4.

A controller 104 controls operations of the various switches S1-S6. Although just one controller 104 is shown in FIG. 1, it is noted that in other examples, multiple controllers can be employed. In some examples, the core network that includes the switches S1-S6 can be a Software-Defined Network (SDN), in which case the controller 104 is an SDN controller that has machine-readable instructions (e.g. software or firmware) that controls operations of the switches in the core network. With SDN, a control plane and a data plane are separated. The control plane is implemented using one or multiple SDN controllers, while the data plane is implemented with the switches in the core network. The control plane can make decisions about how traffic is to be forwarded through the core network. The control plane, including the SDN controller 104, can send control information to the switches S1-S6 to control forwarding of traffic data packets by the switches. In some examples, the communications mechanism between the SDN controller 104 and the switches S1-S6 is according to an OpenFlow protocol.

In other examples, other types of networks can be employed, in which control functionality can be included as being part of the switches rather than on a separate controller.

More generally, the controller 104 can be separate from the switches of the core network, or alternatively, the controller 104 can be part of one of the switches, or can be distributed across multiple switches.

As shown in FIG. 1, the client 102 is able to roam (at 106) from a first position to a second position. In the first position, the client 102 is wirelessly connected to the wireless access point AP12. At the second position, the client 102 is wirelessly connected to the wireless access point AP51. Note that the wireless access point AP12 is connected to switch S1, while the wireless access point AP51 is connected to switch S5.

Initially, when the client 102 is at the first position, the client 102 is wirelessly connected to the wireless access point AP12, which is connected to the switch S1. The switch S1 connected to the AP12 has to handle traffic for the client 102 in respective active tunnels that are part of the overlay network.

In the example according to FIG. 1, the client 102 is able to communicate with destination endpoint device D1 using a path that includes switches S1 and S6 (and other intermediate switches). In some examples, when the client 102 initially starts to communicate using the wireless access point AP12, an active tunnel between switch S1 and switch S6 can be dynamically associated with the virtual network to allow communication between the client 102 (at the first position) and the endpoint device D1 over the virtual network that is overlaid on the physical network that includes the core network of switches S1-S6 and the wireless access points. In the present disclosure, reference to a tunnel between switch Sx and switch Sy can refer to a bi-direction tunnel between Sx and Sy, or alternatively, to a pair of tunnels (one from Sx to Sy, and the other from Sy to Sx).

Similarly, to communicate with destination endpoint device D2, an active tunnel between switches S1 and S5 is initially dynamically associated with the virtual network. For communications between the client 102 and destination endpoint device D3, an active tunnel between switches S1 and S4 is initially dynamically associated with the virtual network. Assuming that the client 102 is communicating over the virtual network with each of the destination endpoint devices D1, D2, and D3, the active tunnels that are initially members of the virtual network to allow the client 102 to communicate with the destination endpoint devices D1, D2, and D3 include the S1-S6 tunnel, the S1-S5 tunnel, and the S1-S4 tunnel.

For each of the destination endpoint devices D1, D2, and D3, the controller 104 is able to identify the respective tunnel endpoint of the virtual network (overlay network): switch S6, S5, and S4, respectively. Note that if an active tunnel to the respective tunnel endpoint already exists, then the existing active tunnel can be reused for the traffic to the respective destination endpoint device from the client 102.

When the client 102 moves (roams) to the second position, the client 102 is no longer connected to the wireless access point AP12, but rather, is wirelessly connected to the wireless access point AP51. In response to the movement of the client 102 to the second position, one or multiple new active tunnels are associated with the virtual network to allow the client 102 to communicate with the endpoint devices D1, D2, and D3. The new active tunnels are to switches that are associated with the endpoint devices D1, D2, and D3.

In response to movement of the client 102 to the second position, an active tunnel between switches S5 and S6 and an active tunnel between switches S5 and S4 are dynamically associated with the virtual network, to allow the client 102 at the second position to communicate over the virtual network with endpoint devices D1 and D3. Note that endpoint device D2 is wirelessly connected to a wireless access point AP52 that is also connected to switch S5, so that the client 102 can communicate with the endpoint device D2 through the switch S5 (without use of any tunnel between switches).

Note that in other examples, if the client 102 moves to a position in a coverage area of a wireless access point that is connected to the same switch as the wireless access point AP12, then the overlay network connectivity does not have to be changed (in other words, the logical membership of active tunnels in the virtual network does not have to change).

As noted above, dynamically associating an active tunnel with a virtual network in response to movement of a wireless endpoint device (such as the client 102) can include either (1) dynamically creating the tunnel, or (2) transforming a previously passive tunnel to an active tunnel, for inclusion as a logical member of the virtual network.

In implementations where dynamic association of an active tunnel with a virtual network involves transforming a passive tunnel to an active tunnel, a full mesh of passive tunnels can be initially created, where the full mesh in FIG. 1 includes passive tunnels between each pair of switches (e.g. a tunnel between switches S1 and S2, a tunnel between switches S1 and S3, a tunnel between switches S1 and S4, a tunnel between switches S1 and S5, a tunnel between switches S1 and S6, a tunnel between switches S2 and S3, a tunnel between switches S2 and S4, etc.). In response to roaming of the client 102, a selected one of the passive tunnels can be transformed to an active tunnel for association with the virtual network.

The dynamic association of tunnels with a virtual network can be a predictive association, where dynamic association is based on predicting that a moving wireless endpoint device is likely to connect to a specific wireless access point (of multiple possible wireless access points). The predictive dynamic association can be based upon signal strengths of wireless communications (and more specifically, wireless signals) between the client 102 and respective access points.

For example, as the client 102 moves for its first position, the signal strength between the client 102 and the wireless access point AP12 degrades as the client 102 moves farther away from the wireless access point AP12. The signal strength with other access points (e.g. access points AP22, AP41, and AP51) increase as movement of the client 102 brings the client 102 closer to these access points.

Each access point can repeatedly scan communication channels with wireless endpoint devices to monitor the signal strength with the respective wireless endpoint devices. The scanning can be done on a periodic basis, or alternatively, can be performed in response to detecting specific events, or in response to commands from the controller 104.

A signal strength of a wireless signal between a wireless endpoint device and a wireless access point can be based on one or some combination of the following parameters: measured power (such as expressed in decibel-milliwatts or dBm), a signal-to-noise measure, a measure of interference, a measure of a noise level, and so forth.

Figure 2:
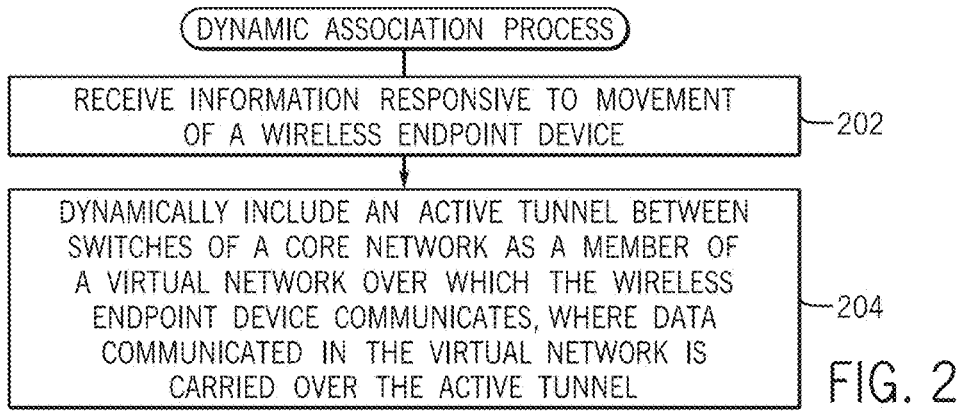
FIGS. 2 and 3 are flow diagrams of example dynamic association processes for dynamically changing the logical membership of tunnels in a virtual network, according to some implementations.

FIG. 2 is a flow diagram of a dynamic association process that can be performed by the controller 104 according to some implementations. As noted above, the controller 104 can be separate from the switches S1-S6, or alternatively, the controller 104 can be implemented on one or some combination of the switches S1-S6.

The controller receives (at 202) information responsive to movement of a wireless endpoint device (e.g. the client 102 in FIG. 1) across wireless access points. In response to the received information, the controller dynamically includes (at 204) an active tunnel between switches of a core network as a member of a virtual network (overlay network) over which a wireless endpoint device communicates. Data communicated in the virtual network is carried over the active tunnel.

Note that the virtual network can be associated with attributes (stored in a data structure associated with the virtual network by the controller 104) that identifies active tunnels that are members of the virtual network. Dynamically including a new active tunnel as a member of the virtual network can involve updating the attributes to include the new active tunnel.

Figure 3:
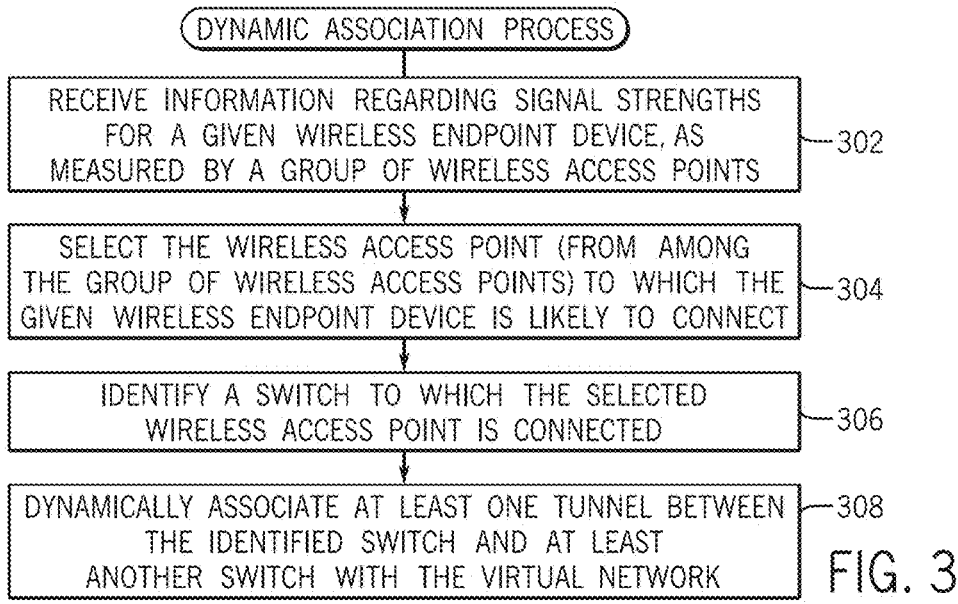

FIG. 3 is a flow diagram of a dynamic association process performed by the controller 104 according to further implementations. The controller 104 receives (at 302) information regarding signal strengths for a given wireless endpoint device (e.g. the client 102), where the signal strengths are measured by corresponding different wireless access points (of a group of wireless access points) that have detected signals from the client 102. Depending on proximity of the client 102 to each wireless access point, the signal strength measured by one wireless access point can be greater than the signal strength measured by another wireless access point.

Note that the receiving (at 302) of the information regarding signal strengths for the client 102 measured by the group of wireless access points can be triggered in response to the signal strength of a wireless access point to which the client 102 is initially connected to dropping below a predefined threshold (which can be configured by an administrator or can be dynamically set). Note also that the predefined threshold can be the same for different wireless access points, or can be different for at least some of the wireless access points.

As the client 102 moves away from the initial wireless access point, the signal strength of signals between the client 102 and the initial wireless access point drops until it falls below the predefined threshold. This drop of the signal strength measured by the initial wireless access point below the specified threshold is communicated by the initial wireless access point to the controller 104, and is used as a trigger to cause the controller 104 to gather or retrieve information regarding signal strengths for the client 102 measured by other wireless access points. For example, the controller 104 can poll various switches to determine whether the switches have received signal strength information for the client 102.

In other examples, instead of the controller 104 polling the switches, the switches can send signal strength measurements to the controller 104 without request of the controller 104; the controller 104 can decide whether or not to use the signal strength measurements based on whether the trigger has occurred.

The controller 104 selects (at 304) the wireless access point (from among the group of wireless access points) with the strongest signal strength as the predicted candidate wireless access point to which the client 102 is likely to wirelessly connect. Instead of selecting the wireless access point with the strongest signal strength, a different criterion can be used for selecting a wireless access point from among the group of wireless access points based on signal strengths in the received information. In other examples, multiple wireless access points can be selected according to a criterion (or criteria).

Note that in performing the selecting (at 304), the controller 104 can consider those wireless access points that have reported signal strengths that exceeded a specified threshold (which can be configured by an administrator or can be dynamically set). Note also that the specified threshold can be the same for different wireless access points, or can be different for at least some of the wireless access points.

The controller 104 next identifies (at 306) a switch to which the selected wireless access point is connected. The controller 104 then dynamically associates (at 308) at least one active tunnel between the identified switch and at least another switch, where each dynamically associated active tunnel is included as a logical member of the virtual network in which the wireless endpoint device is able to communicate.

In some implementations, unused tunnels can be removed by the controller 104. An unused active tunnel can be an active tunnel that was dynamically associated due to the predictive dynamic association performed in accordance with some implementations, as discussed above. Since the dynamic association of an active tunnel according to FIG. 3 is predictive in nature, it may turn out that an active tunnel that was dynamically associated with a virtual network may not actually be used. In this case, the controller 104 can remove the unused active tunnel. An active tunnel can become unused for other reasons, such as due to wireless endpoint device(s) becoming inactive.

In the discussion made with respect to FIGS. 2 and 3, reference is made to one virtual network. Note that the process of FIG. 2 or 3 can be applied to other virtual networks overlaid on the underlay physical network of FIG. 1, for example, if such other virtual networks exist.

Figure 4:
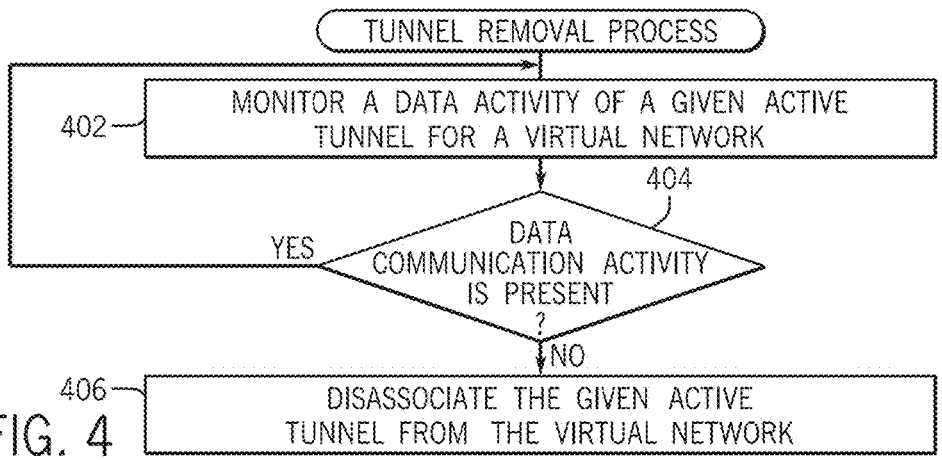
FIG. 4 is a flow diagram of an example tunnel removal process according to some implementations.

FIG. 4 is a flow diagram of removing an unused active tunnel according to some implementations. The controller 104 monitors (at 402) a data communication activity of a given active tunnel for a virtual network. The monitoring can involve counting a number of data packets communicated through a given active tunnel. If the controller 104 determines (at 404) that data communication activity is present, then the process of FIG. 4 returns to task 402.

However, if the controller 104 determines (at 404) that there has been no data communication activity in the given active tunnel within a configured time interval (e.g. a count of data packets in the configured time interval through the given active tunnel is zero or less than some specified threshold), then the controller 104 disassociates (at 406) the given active tunnel from the virtual network (such as by removing or deleting the given active tunnel as being a member of the virtual network, or by transforming the given active tunnel to a passive tunnel).

The process of FIG. 4 can be repeated for each active tunnel in the virtual network. Also, if there are other virtual networks present, then the process of FIG. 4 can also be applied to the other virtual networks.

Figure 5:
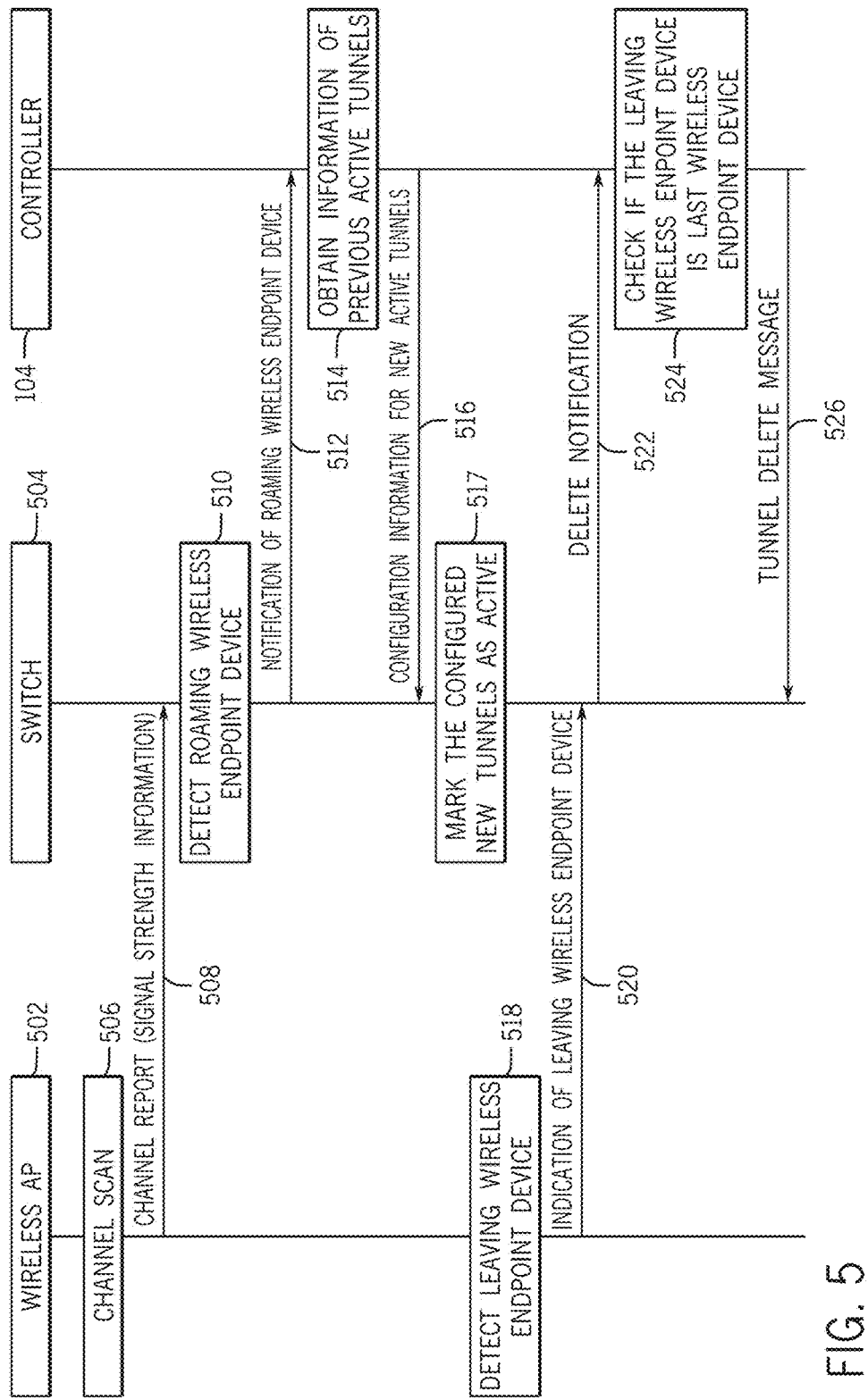
FIG. 5 is a flow diagram of example tasks and messages of various nodes, according to some implementations.

FIG. 5 is a message flow diagram of various tasks and messages of a wireless access point 502, a switch 504, and the controller 104, according to alternative implementations. The wireless access point 502 performs (at 506) channel scanning of one or multiple channels on which the wireless access point communicates wirelessly with wireless endpoint devices. The channel scanning can be performed repeatedly, or in response to events.

The wireless access point 502 sends (at 508) a channel report to the switch 504, where the channel report includes signal strength information of wireless endpoint devices (along with other information).

The switch 504 determines (at 510), based on the signal strength information, whether a roaming wireless endpoint device has been detected. For example, the switch 504 may detect a signal strength for a new wireless endpoint device (a wireless endpoint device the switch 504 has not previously seen) being greater than a specified threshold.

In response to detecting the roaming wireless endpoint device, the switch 504 sends (at 512) a notification to the controller 104, where the notification includes information relating to the roaming wireless endpoint device. This notification provides an indication that a wireless access point has newly detected a roaming wireless endpoint device.

In response to the notification, the controller 104 obtains (at 514) information relating to active tunnels (to a previously connected switch prior to roaming of the roaming wireless endpoint device) that are part of the virtual network in which the roaming wireless endpoint device communicates. These previous active tunnels are tunnels to various switches associated with destination endpoint devices with which the roaming wireless endpoint device is communicating through the virtual network.

The controller 104 then sends (at 516) configuration information to the switch 504 to configure new active tunnels based on the previous active tunnels. The configured new active tunnels are dynamically associated with the virtual network. In response to the configuration information, the switch 504 marks (at 517) the configured new tunnels (which may have been newly created or have been transformed from the passive states) as active.

As further shown in FIG. 5, the wireless access point 502 also detects (at 518) a wireless endpoint device leaving the coverage area the wireless access point 502. In response, the wireless access point 502 sends (at 520) an indication of the leaving wireless endpoint device to the switch 504.

In response to the indication, the switch 504 sends (at 522) a delete notification to the controller 104 to notify the controller 104 that tunnels associated with the leaving wireless access point may have to be deleted.

In response to the delete notification, the controller 104 checks (at 524) if the leaving wireless endpoint device is a last wireless endpoint device that communicates in the virtual network using the switch 504. In other words, the controller 104 determines whether there are any other wireless endpoint devices that communicate in the virtual network using the switch 504.

If the given wireless endpoint device is a last wireless endpoint device that communicates in the virtual network using the switch 504, then the controller 104 sends (at 526) a tunnel delete message to the switch 504, to cause the switch 504 to delete all active tunnel(s) between the switch 504 and other switch(es).

The following describes further details associated with implementations where passive tunnels are transformed to active tunnels on a dynamic basis. In the example of FIG. 1, the client 102 is initially associated with the wireless access point AP12, which is connected to switch S1. Alternatively, the client 102 may have moved to the coverage area of the wireless access point AP12 from another wireless access point. All the tunnels of switch S1 can now be candidates to be associated with the virtual network to which the client 102 is connected. The switch S1 can also notify the other tunnel endpoints (of tunnels connected to the switch S1) about the active status of the respective tunnels. In the example of FIG. 1, these other tunnel endpoints include switches S2-S6.

Each of the other switches, S2-S6 (hereinafter referred to as "notified switches"), upon receiving the active tunnel notification from switch S1, can determine whether the notified switch is connected to a wireless endpoint device that communicates over the virtual network. If the notified switch determines that the notified switch is associated with a wireless endpoint device that communicates over the virtual network, then the notified switch identifies the respective tunnel to switch S1 as active, and can mark the tunnel as having joined the overlay network. In the example of FIG. 1, switches S2 and S3 are not associated with any wireless endpoint devices that communicate over the virtual network, while switches S4, S5, and S6 are associated with any wireless endpoint devices that communicate over the virtual network.

Each notified switch (S4, S5, or S6) that has marked the respective tunnel as active can respond to the active tunnel notification with a respective reply message including an "Active" indicator set to an active value. However, each notified switch (S2 or S3) that is not associated with any wireless endpoint devices that communicate over the overlay network can respond with a respective reply message including an "Active" indicator set to an inactive value. As a result, the tunnels between switch S1 and respective switches S2 and S3 are maintained as passive tunnels.

If switch S1 has not received a reply message to the active tunnel notification on all tunnels, switch S1 can retransmit the active tunnel notification to those switch(es) that has (have) not responded.

At switch S1, each tunnel over which switch S1 has received a reply message with the "Active" indicator set to an active value can be marked as active, and thus has been joined to the virtual network.

In some implementations, information about a wireless endpoint device can be provided from an initial wireless access point serving the wireless endpoint device to neighboring wireless access points. Such information about the wireless endpoint device can be cached at the neighboring wireless access points. The cached information can include an identifier of the wireless endpoint device, such as its Virtual Network Identifier (VNI), credential information (e.g. username, password, etc.), and so forth.

Caching the information about the wireless endpoint device can reduce the control traffic for identification of the wireless endpoint device, which can enhance seamless roaming.

In the example of FIG. 1, when the client 102 is initially connected to wireless access point AP12, the credential information and the VNI of the client 102 can be sent from the wireless access point AP12 for caching on neighboring wireless access points AP11, AP42, AP22, and AP41. Once the client 102 moves to the vicinity of AP22 with signal strength increasing above a specified threshold, AP22 can use the cached information to initiate the join of the relevant active tunnels (those connected to switch S2 to which AP22 is connected) to the virtual network.

Using dynamic active tunnel association techniques or mechanisms according to some implementations, more efficient utilization of switch resources and network bandwidth can be achieved.

Figure 6:
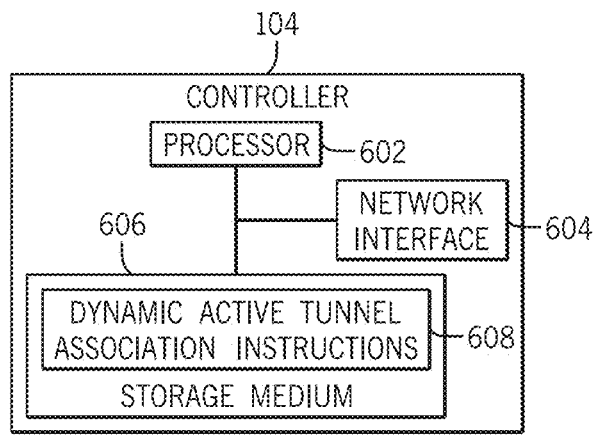
FIG. 6 is a block diagram of an example controller according to some implementations.

FIG. 6 is a block diagram of an example controller 104 according to some implementations. The controller 104 includes one or multiple processors 602, which can be connected to one or multiple network interfaces 604 to communicate over respective links to switches or other entities.

The controller 104 also includes a non-transitory computer-readable or machine-readable storage medium (or storage media) 606, which can store data and machine-readable instructions. In some implementations, the machine-readable instructions include dynamic active tunnel association instructions 608 for performing various tasks as discussed in this disclosure, including tasks depicted in FIGS. 2-4, as well as other tasks described in the present application. The dynamic active tunnel association instructions 608 can be executed on the processor(s) 602.

A processor can include a microprocessor, a microcontroller, a physical processor module or subsystem, programmable integrated circuit, programmable gate array, or another physical control or computing device.

Figure 7:
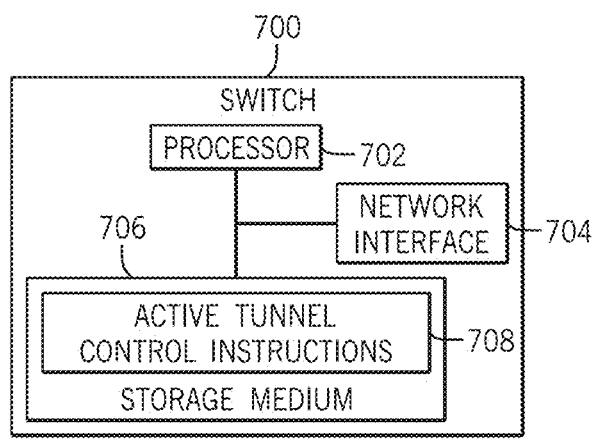
FIG. 7 is a block diagram of an example switch according to some implementations.

FIG. 7 is a block diagram of an example switch 700 (any of the switches S1-S6 depicted in FIG. 1 or the switch 504 of FIG. 5) according to some implementations. The controller 700 includes one or multiple processors 702, which can be connected to one or multiple network interfaces 704 to communicate over respective links to switches or other entities.

The switch 700 also includes a non-transitory computer-readable or machine-readable storage medium (or storage media) 706, which can store data and machine-readable instructions. In some implementations, the machine-readable instructions include active tunnel control instructions 708 for performing various tasks as discussed in this disclosure, for marking a tunnel between the switch 700 and another switch as active. The active tunnel control instructions 708 can be executed on the processor(s) 702.

The storage medium (or storage media) 606 or 706 can include any one or multiple of different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, by a controller, information responsive to movement of a wireless device across wireless access points; and
   in response to the information, dynamically including, by the controller, an active tunnel between switches of a core network as a member of a virtual network over which the wireless device communicates, wherein data communicated in the virtual network is carried over the active tunnel, and wherein the virtual network is overlaid on an underlay physical network that includes the core network and the wireless access points;
   in response to determining that a signal strength of the wireless communication detected by a first wireless access point has dropped below a threshold, retrieving, by the controller, information of signal strength of wireless communication of the wireless device detected by at least a second wireless access point,
   wherein dynamically associating the active tunnel with the virtual network is based on the information of the signal strength the wireless communication of the wireless device detected by at least the second wireless access point.

2. The method of claim 1, further comprising dynamically including an active tunnel between switches of the core network as a member of the virtual network in response to the wireless device becoming associated with an access point connected to a switch of the core network.

3. The method of claim 1, wherein dynamically including the active tunnel as a member of the virtual network comprises creating the tunnel between the switches of the core network.

4. The method of claim 1, wherein dynamically including the active tunnel as a member of the virtual network comprises transforming a previously passive tunnel to the active tunnel, wherein data communicated in the virtual network is not carried through the previously passive tunnel.

5. The method of claim 1, wherein the virtual network is associated with attributes indicating tunnels that are members of the virtual network, the tunnels between respective switches of the core network, and wherein dynamically including the active tunnel as a member of the virtual network comprises updating the attributes to change a membership of tunnels of the virtual network.

6. The method of claim 1, wherein receiving the information comprises receiving information indicating that a given wireless access point has newly detected the wireless device.

7. The method of claim 1, wherein receiving the information is responsive to the signal strength of wireless communication of the wireless device detected by the wireless access point.

8. The method of claim 1, further comprising:
   dynamically disassociating a given active tunnel if a data activity in the given active tunnel does not satisfy a specified criterion.

9. A controller comprising:
   at least one processor to:
      receive information responsive to movement of a wireless device across wireless access points; and
      in response to the information, dynamically change a set of active tunnels that are logical members of a virtual network that is overlaid on an underlay physical network that includes the wireless access points and a core network of switches, wherein the wireless device is to communicate over the virtual network and the tunnels are to carry data of the virtual network;
      in response to determining that a signal strength of the wireless communication detected by a first wireless access point has dropped below a threshold, retrieving, by the controller, information of signal strength of wireless communication of the wireless device detected by at least a second wireless access point,
      wherein dynamically associating the active tunnel with the virtual network is based on the information of the signal strength the wireless communication of the wireless device detected by at least the second wireless access point.

10. The controller of claim 9, wherein dynamically changing the set of active tunnels comprises predictively changing the set of active tunnels in response to the received information.

11. The controller of claim 10, wherein receiving the information comprises receiving information relating to signal strengths of the wireless device at plural wireless access points, wherein predictively changing the set of active tunnels comprises:
   selecting at least one of the plural wireless access points based on the signal strengths; and
   dynamically including at least one active tunnel in the set of active tunnels, wherein the at least one active tunnel is connected to a switch that is connected to the selected at least one wireless access point.

12. The controller of claim 10, wherein the at least one processor is to further:
   detect that at least one tunnel in the predictively changed set of active tunnels is unused; and
   remove the at least one unused tunnel from the set of active tunnels.

13. A non-transitory computer readable storage medium comprising a set of instructions executable by a hardware processor of a controller to:
   receive information responsive to movement of a wireless device across wireless access points; and
   in response to the information, dynamically include an active tunnel between switches of a core network as a member of a virtual network over which the wireless device communicates, wherein data communicated in the virtual network is carried over the active tunnel, and wherein the virtual network is overlaid on an underlay physical network that includes the core network and the wireless access points;
   in response to determining that a signal strength of the wireless communication detected by a first wireless access point has dropped below a threshold, retrieve information of signal strength of wireless communication of the wireless device detected by at least a second wireless access point, wherein dynamically associating the active tunnel with the virtual network is based on the information of the signal strength the wireless communication of the wireless device detected by at least the second wireless access point.

14. The medium of claim 13, wherein the set of instructions further comprises instructions executable by the hardware processor of the controller to dynamically include at least one of:
   an active tunnel between switches of the core network as a member of the virtual network in response to the wireless device becoming associated with an access point connected to a switch of the core network;
   the active tunnel as a member of the virtual network comprises creating the tunnel between the switches of the core network; and
   the active tunnel as a member of the virtual network comprises transforming a previously passive tunnel to the active tunnel, wherein data communicated in the virtual network is not carried through the previously passive tunnel.

15. The medium of claim 13, wherein the set of instructions further comprises instructions executable by the hardware processor of the controller to:
   detect a wireless device that has roamed to a first wireless access point, the first switch connected to the first wireless access point; and
   dynamically mark a tunnel between the first switch and a second switch as active, wherein the active tunnel is a member of a virtual network over which the wireless device communicates, wherein data communicated in the virtual network is carried over the active tunnel, and wherein the virtual network is overlaid on an underlay physical network that includes the first and second switches and wireless access points.

16. The medium of claim 15, wherein dynamically marking the tunnel as active is in response to one of (1) configuration information from a controller, and (2) a reply message from the second switch.

17. The medium of claim 13, wherein the virtual network is associated with attributes indicating tunnels that are members of the virtual network, the tunnels between respective switches of the core network, and wherein the set of instructions further comprises instructions executable by the hardware processor of the controller to update the attributes to change a membership of tunnels of the virtual network.

18. The medium of claim 13, the set of instructions further comprises instructions executable by the hardware processor of the controller to receive information indicating that a given wireless access point has newly detected the wireless device.

19. The medium of claim 13, the set of instructions further comprises instructions executable by the hardware processor of the controller to receive the information in responsive to the signal strength of wireless communication of the wireless device detected by the wireless access point.

* * * * *